March 17, 1953  F. H. MUELLER ET AL  2,631,812
LUBRICATED VALVE PLUNGER
Filed May 10, 1948
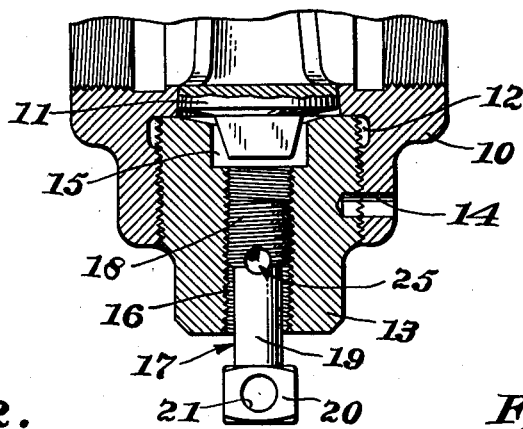
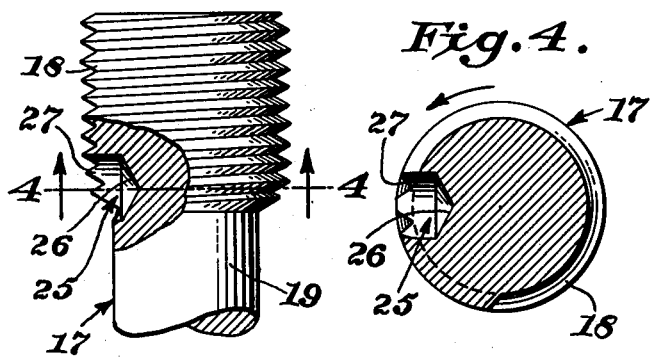
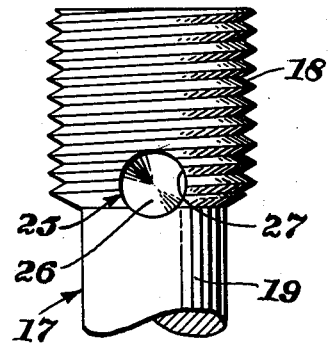
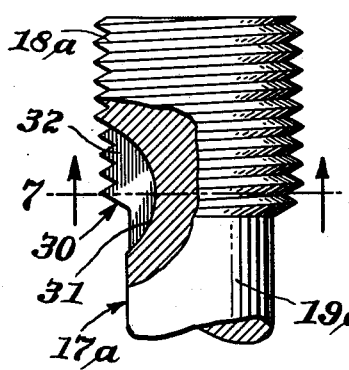
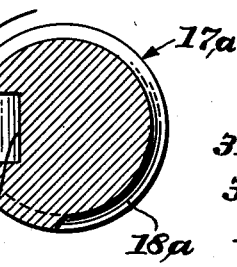
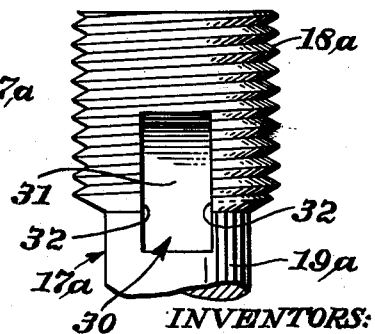
INVENTORS:
Frank H. Mueller,
Earl W. Lowe,
BY Cushman, Darby & Cushman
ATTORNEYS.

Patented Mar. 17, 1953

2,631,812

UNITED STATES PATENT OFFICE 2,631,812

LUBRICATED VALVE PLUNGER

Frank H. Mueller and Earl W. Lowe, Decatur, Ill., assignors to Mueller Co., Decatur, Ill., a corporation of Illinois Application May 10, 1948, Serial No. 26,128

3 Claims. (Cl. 251—93)

The present invention relates to lubricated valves.

It is customary to provide numerous types of valves with a plunger threaded into a lubricant reservoir to enable lubricant to be forced to the seating surface, the plunger being unthreaded from the reservoir when additional lubricant is to be placed therein. When a valve of this type is not operated for a long period of time, as is the case with gas stops, the outer portion of the threads which receive the plunger become corroded. As a result, it is difficult to rotate the plunger with respect to those threads.

An object of the present invention is to provide a valve including means to enable corroded threads to be cleared and which means is of simple arrangement and involves low manufacturing cost.

Other objects and advantages of the invention will be apparent from the following specification and accompanying drawing wherein:

Figure 1 is an axial section of a valve;

Figure 2 is an elevation of a lubricant plunger with a portion in axial section;

Figure 3 is a view looking toward Figure 2 from the left;

Figure 4 is a section on the line 4—4 of Figure 2;

Figure 5 is an elevation of a modified form of plunger with a portion in axial section;

Figure 6 is a view of the Figure 5 device looking toward Figure 5 from the left, and Figure 7 is a sectional view on the line 7—7 of Figure 5.

Figure 1 discloses a valve including a casing 10 and a plug element 11. The casing 10 includes a bore 12 at the larger end of the seat for the plug. Bore 12 is threaded to receive a cap element 13 and the bore and cap are of sufficient diameter that when the cap is removed from the bore, the plug 11 may be removed from the casing 19. Cap 13 may be held against rotation by a pin inserted in a radial socket 14 and includes a socket 15 at its inner end to which a threaded bore 16 opens from the exterior of the cap. A plunger generally designated by the numeral 17 is adapted to be threaded in the bore 16, the plunger including an outer threaded portion 18, a stem 19 of less diameter than the threaded portion, and an operating head 20. The operating head 20 will be provided with flat faces to receive a wrench and may be provided with an aperture therein to receive a removable operating pin.

The seating surface of the valve will be lubricated by placing a stick of lubricant of the usual type in the plunger bore 16 and then rotating the plunger 17 inwardly. This movement of the plunger applies pressure to the lubricant to thereby force it from the lubricant chamber 15 to the seating surface of the valve. Whenever it is necessary to apply additional pressure to the lubricant the plunger 17 may be threaded further inwardly. It is usual to so gauge the quantity of the lubricant placed in the bore 16 and chamber 15 that the threaded portion 18 of the plunger 17 will not be exposed beyond the outer surface of the cap 13. Unless this is done, the threads of the plunger 17 may be struck and marred, thereby causing the threads of the bore 16 to also be marred when the plunger is threaded further inwardly at a later date. To further attain this purpose, the threads 18 terminate at a point which is well spaced from the operating head 20 of the plunger.

As a result of the above-described practice followed with these valves, as well as the characteristics of the stem which have just been described, the outer portion of the threads of the threaded bore 16 will be exposed in the manner generally illustrated in Figure 1. In other words, the outer portion of the threads 16 will not be engaged or protected by the threads of the plunger 17. Because of the fact that numerous valves of this type, and particularly gas stops, are mounted at points where they are subject to corrosion, the exposed portion of the threads 16 will become rusted or otherwise corroded, particularly if the plunger is not unthreaded from the bore for a long period of time.

Figures 2 to 4 illustrate one form of plunger provided with means to clear corrosion from the threads of the bore 16. The corrosion removing or thread clearing means comprises a pocket 25 including an inner concave conical portion, the pocket being formed by drilling substantially radially of the plunger 17 with a drill of standard type. In other words, the extreme end of the drill, being of conical form, forms the inner and conical portion 26 of pocket 25, while the cylindrical end portion of the drill forms the outer portion of pocket 26. Pocket 25 preferably will only have the depth indicated in Figure 4 so that the plunger will not be weakened.

As is best shown in Figure 4, the outer portion of the pocket, conforming to the cylindrical part of the drill, will include a wall portion 27 which, during unthreading rotation of the plunger in the direction of the arrow associated with Figure 4, will be the trailing wall portion of the pocket 25. As is best shown in Figure 3, this wall portion intersects several threads of the threaded portion 18 adjacent the non-threaded stem 19 of the plunger. It will also be observed that a line lying in any portion of the wall 27 will also lie in a plane which is substantially parallel to a diameter of a plunger 17. Therefore, when the stem 17 is rotated in the direction indicated in Figure 4, the wall 27 will rake any corrosion from the exposed portions of the threaded bore 16. The fact that pocket 25 extends diametrically inwardly of the threads 18, as by the provision of a conical portion 26, enables any rust or other particles cleared from the threaded bore to accumulate in this pocket as the stem is unthreaded.

The pocket 25 of Figures 2 to 4 can be readily formed in the plunger 17 without great expense because extreme accuracy is not necessary in drilling the pocket. In more detail, it is only necessary that the pocket be positioned at such point lengthwise of the stem that it will extend completely through the base portion of the outermost thread and also will extend through a number of the adjacent outer threads of the stem. Thus, the pocket will extend through all of the threads which are adjacent the non-threaded portion of the stem. When the same is backed out, these outer threads will first engage the exposed threads of the bore 16. It is also unnecessary to position the drill truly radially of the plunger 17 so long as it is positioned with sufficient accuracy that lines lying in the wall 27 will be substantially parallel to a diameter of the plunger. It is preferred to drill the pocket 25 in the plunger before the portion 18 is threaded.

It will be noted that by having the major length of the arcuate wall 27 positioned parallel to a diameter of the plunger, rather than lying radially of the plunger, the wall 27 will have a raking or undercutting effect with respect to the threads of bore 16.

Figures 5 to 7 show a modified form of plunger 17a which is similar to the plunger 17, except that a pocket 30 is milled therein, either by a cutting tool or a grinding tool. The inner wall 31 of pocket 30 will conform to the periphery of the milling tool or grinding wheel, while the side walls 32 will be flat in conformity with the radial faces of the miller or grinding wheel. The wall 32 which will be the trailing wall during unthreading of the plunger 17 from bore 16 will clear the threads of the bore. It will be noted that the pocket 30, like the pocket 25, need not be positioned with extreme accuracy, it being sufficient if it extends across several of the threads adjacent the stem portion 19a and has its side walls 32 substantially parallel to a diameter of the plunger. Every line lying in the walls 32 will lie substantially parallel to a diameter of the valve.

The fact that the walls 32 of pocket 30, like wall 27 of pocket 25, have every line thereof preferably parallel to a diameter or radius of the plunger, rather than exactly on a radius or diameter, enables the walls to have the raking or undercutting action mentioned above. However, it will be noted that the wall 27 and walls 32 also may be considered as lying substantially on diameters or radii of their plungers.

Because the pockets 25 and 30 are positioned a substantial distance from the free or pressure face of the plungers 17 and 17a, respectively, the piston action of that face will not be reduced in any respect. In other words, an adequate, uninterrupted area of threads 18 will be provided between the plunger face and the pockets 25 and 30 so that no leakage of lubricant can occur by reason of the provision in the pockets.

A plunger which has its stem 19 three-eighths of an inch in diameter and its threaded portion 18 one-half of an inch overall diameter may have its pocket 25 formed by a three-sixteenths of an inch drill. Larger sized plungers may be provided with a pocket which is of proportionately slightly larger diameter.

The terminology used in the specification is for the purpose of description and not of limitation, the scope of the invention being indicated in the claims.

We claim:

1. In a lubricated valve including a casing and a valve element, a lubricant reservoir in communication with the seating surface, said reservoir including a threaded bore extending therefrom to the exterior of the casing, a lubricant plunger in the reservoir bore, said plunger including a threaded portion of less length than the threaded bore to engage the threads of the bore and enable the plunger to be moved inwardly and outwardly of the bore, the free end of the plunger threaded portion comprising the inner and pressure face of the plunger, said plunger also including a stem portion outwardly of the threaded portion and of less diameter than the threaded portion, said threaded portion being provided with a peripheral pocket including a wall intersecting a plurality of the threads at the outer end of the threaded portion and lying along a line extending substantially diametrically of the plunger so as to rake the bore threads during outward unthreading travel of the plunger, said pocket extending completely through the base portion of the outermost thread, the pocket being relatively small in a direction axially of the plunger and the threaded portion being of sufficient length that the pocket will be spaced such distance from the pressure face of the plunger to avoid leakage of pressure from the lubricant reservoir.

2. A valve of the character described in claim 1 wherein said wall of the pocket is curved about a line extending radially of the plunger.

3. A valve of the character described in claim 1 wherein said wall of the pocket is straight lengthwise of the plunger.

FRANK H. MUELLER.
EARL W. LOWE.

REFERENCES CITED

The following references are of record in the file of this patent:

UNITED STATES PATENTS

| Number | Name | Date |
| --- | --- | --- |
| 1,932,322 | Nordstrom | Oct. 24, 1933 |
| 1,963,542 | Bergstrom | June 19, 1934 |
| 2,136,458 | Olson | Nov. 15, 1938 |
| 2,171,590 | Milliken | Sept. 5, 1939 |